Figure 3:
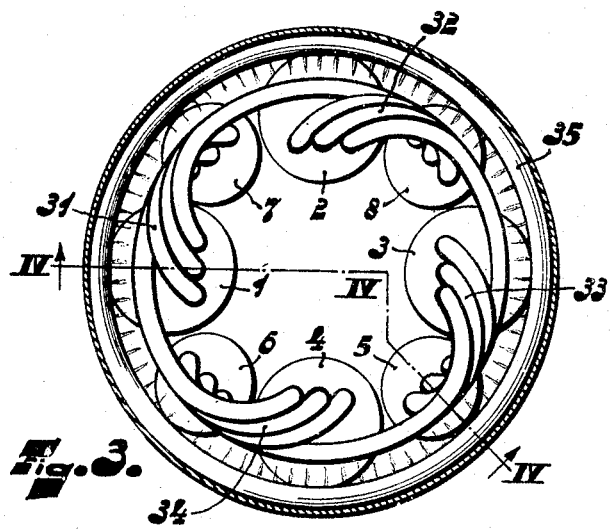

Dec. 31, 1957  F. L. VAN WEENEN ET AL  2,817,950
HOT-GAS RECIPROCATING ENGINE CONSTRUCTION
Filed Jan. 12, 1952  4 Sheets-Sheet 1
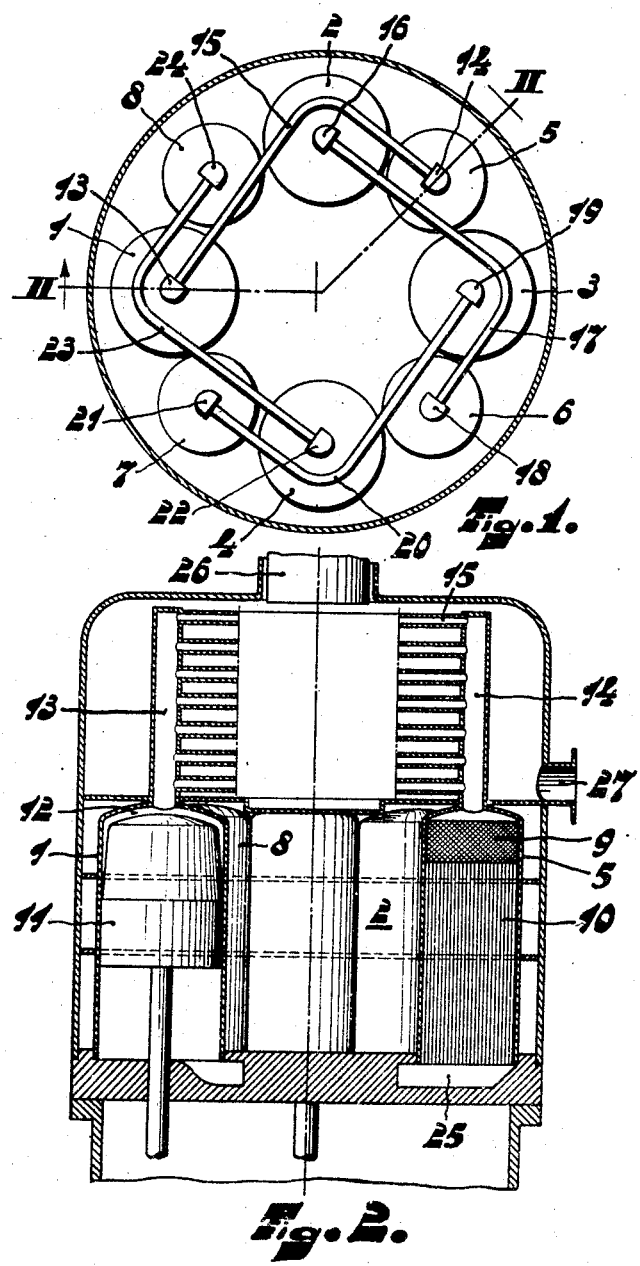
INVENTORS
Franciscus Lambertus Van Weenen
Albert August Dros INVENTORS
Franciscus Lambertus Van Weenen
Albert August Dros Dec. 31, 1957   F. L. VAN WEENEN ET AL   2,817,950
HOT-GAS RECIPROCATING ENGINE CONSTRUCTION
Filed Jan. 12, 1952   4 Sheets-Sheet 3

INVENTORS
Franciscus Lambertus Van Weenen
Albert August Dros
By
Agent

Dec. 31, 1957 F. L. VAN WEENEN ET AL 2,817,950
HOT-GAS RECIPROCATING ENGINE CONSTRUCTION
Filed Jan. 12, 1952 4 Sheets-Sheet 4

INVENTORS
Franciscus Lambertus Van Weenen
Albert August Dros
By
Agent

United States Patent Office

2,817,950
Patented Dec. 31, 1957

2,817,950

HOT-GAS RECIPROCATING ENGINE CONSTRUCTION

Franciscus Lambertus van Weenen and Albert August Dros, Eindhoven, Netherlands, assignors, by mesne assignments, to North American Philips Company, Inc., New York, N. Y., a corporation of Delaware Application January 12, 1952, Serial No. 266,192

Claims priority, application Netherlands January 20, 1951

8 Claims. (Cl. 60—24)

This invention relates to thermodynamic reciprocating engines having two or more closed cycles, the engine having a heat exchanger for the working medium in each cycle, the heat exchanger comprising one or more groups of elements opening at one end into the cylinder space and at the other into the regenerator space and arranged outside the cylinders of the engine.

As a rule, known thermodynamic reciprocating engines comprise a separate burner for each heater associated with a particular cycle. If two or more cycles are performed in the constructions hitherto known, two or more burners are provided and if the heaters are shaped in the form of pipe heaters, each heater is arranged about a space for the combustion gases, so that each group of heater pipes forms its own separate wall to which heat energy is transmitted. In these constructions, the quantities of heat energy absorbed by the groups of pipes and transferred by each group to the working medium of the associated cycle will in general not be equal. Hence, owing to this difference in the quantities of heat energy transferred, the quantity of energy developed by the working medium associated with a particular cycle in the engine is not equal to the quantity of energy produced by the working medium associated with another cycle. This adversely affects the operation of the engine.

The invention has for its object to provide a thermodynamic reciprocating engine comprising a heat exchanger with which the quantity of heat exchanged with the working medium in the various cycles is substantially equal.

The term "thermodynamic reciprocating engine" is to be understood to include hot-gas reciprocating engines and reciprocating refrigerators and reciprocating heat pumps operating on the reversed hot-gas engine principle. In a refrigerator, the said heat exchanger will, as a rule, be used as a freezer.

According to the invention, a thermodynamic reciprocating engine having two or more closed cycles, in which for each cycle the engine comprises a heat exchanger for the working medium of the engine, which comprises one or more elements opening at one end into a cylinder space and at the other end into a regenerator space and arranged outside the cylinders of the engine, is characterized in that the elements together form a wall for the exchange of heat energy, and the portion of the wall surface which is constituted by the elements associated with one cycle is substantially equal to the portion of the wall surface constituted by the elements associated with the other or any other cycle.

In general, the elements will be arranged in a manner such that corresponding parts are located in corresponding temperature zones. It will, in general, be desirable that the wall should be at least substantially cylindrical, however, as an alternative, a flat wall may be formed.

The elements, for example, pipes, may be arranged close to one another, so that gases without and in thermal contact with the pipes pass the surface defined by the wall. However, as an alternative, the elements may be spaced apart from one another so that the said gases can flow about these elements.

A further advantage of this heat exchanger is that it occupies comparatively little space, and if it serves as a heater, despite the small space occupied, a comparatively large combustion space is provided.

The engine may have at least three cycles, the working cylinders of the engine being arranged to form substantially an annulus. It is thus structurally possible to form a simple engine. This engine may include a swash plate mechanism. As an alternative, however, the engine may include a crank shaft mechanism.

Both the working cylinders of the thermodynamic reciprocating engine and the spaces, each of which comprises one regenerator and one cooler, may be arranged to form substantially an annulus.

If the thermodynamic reciprocating engine operates as a hot-gas reciprocating engine, each regenerator and each cooler may be arranged about the associated cold space, each cooler communicating directly with the associated cold space.

Each group of elements associated with one cycle may be arranged at least in part between a group of elements associated with a further cycle and the source of heat or the freezer.

A simple construction is obtained if each group of elements comprises a number of parallel pipes, which extend for most of their lengths substantially at right angles to the centre lines of the cylinders of the engine, corresponding ends of each group of pipes communicating with the associated working space and the other corresponding ends communicating with a space for an associated regenerator.

Each group of pipes may communicate with a space for a regenerator and a cooler and with a working space in the cylinder located next but one from said space, the groups of pipes all being connected in the same sense.

The elements of each group of elements may extend over such part of the perimeter of said wall and be bent in such manner that in each sectional area of this wall through the centreline of a working cylinder invariably at least two groups of pipes each associated with a different cycle are arranged, while each pipe is preferably in part helical.

In a thermodynamic engine in which the cooler is arranged about and communicates directly with the associated cold space, each working space may communicate through a group of elements comprising a number of parallel pipes extending, for a great part, substantially at right angles to the centre lines of the cylinders with that space for the regenerator and cooler which is arranged about the immediately adjacent cylinder, the groups of pipes all being connected in the same sense.

In the engine described above it is desirable to shape the pipes of each group such that they have at least substantially equal lengths and present substantially equal resistances to flow. It is furthermore desirable to distribute the connections of the elements to the regenerators evenly in the plane at right angles to the direction of flow in the individual regenerators.

The group of pipes of a heat exchanger associated with a particular cycle may each communicate at one end with a common duct opening into the associated hot space and at the other end with a common duct opening into the associated regenerator space.

In hot-gas reciprocating engines, the elements may be arranged to surround a central combustion space for the engine. However, as an alternative, the burner may be arranged to surround the common wall formed by the heater elements, as will, for example, be the case, if the burner is formed in the shape of a ring burner.

The sectional areas of the elements may be of different forms; they are preferably circular, but other shapes, for example, rectangular and oval are possible.

Figure 4:
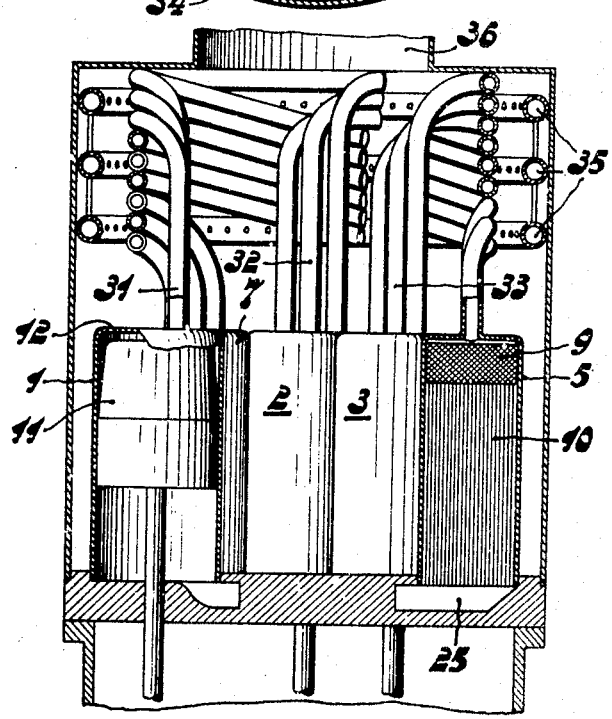
Figure 5:
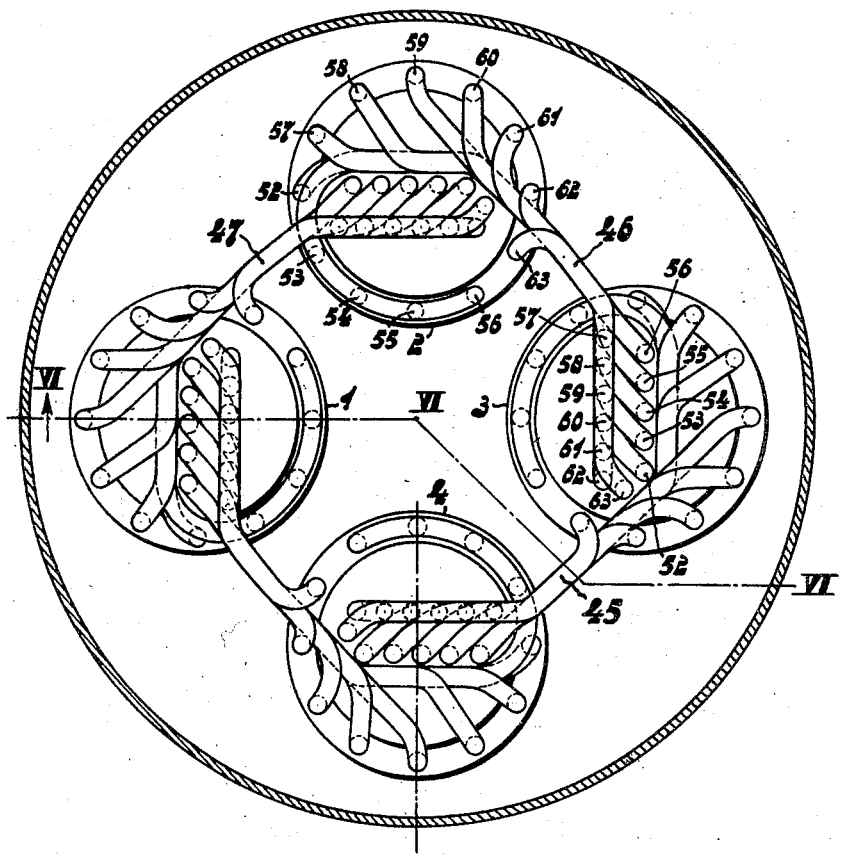
Figure 6:
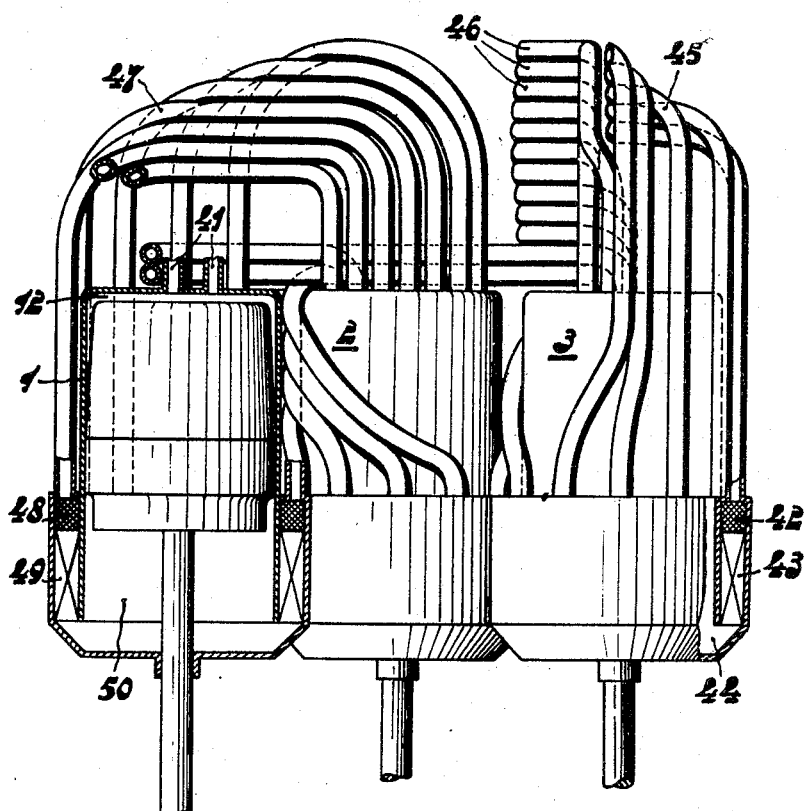

In order that the invention may be more clearly understood and readily carried into effect, it will now be described more fully with reference to the accompanying diagrammatic drawings, given by way of example, in which:

Fig. 1 is a plan view of a thermodynamic reciprocating engine according to the invention and Fig. 2 is a cross sectional view taken on the line II—II of Fig. 1, Fig. 3 is a plan view of a second embodiment of a thermodynamic reciprocating engine according to the invention and Fig. 4 is a cross sectional view taken on the line IV—IV of Fig. 3, and Fig. 5 is a plan view of a third embodiment of a thermodynamic reciprocating engine according to the invention and Fig. 6 is a cross sectional view taken on the line VI—VI of Fig. 5.

The thermodynamic reciprocating engine shown in Fig. 1 is a double-acting four-cycle engine comprising four working cylinders 1, 2, 3 and 4. A regenerator and cooler are associated with each cycle and for each cycle are housed in a common space 5, 6, 7 and 8, respectively. The four working cylinders 1, 2, 3 and 4 and the spaces 5, 6, 7 and 8 are arranged substantially in an annulus. The space 5 shown in Fig. 2 comprises a regenerator 9 and a cooler 10. The further spaces 6, 7 and 8 also comprise each a regenerator and a cooler, which are not shown. Pistons, of which only one piston 11 is shown, are adapted to move in the cylinders.

In the cylinder 1, the piston 11 reciprocates. The space 12 over this piston is the hot space of the associated thermodynamic cycle. The hot space 12 communicates with a duct 13 and the space 5 communicates with a duct 14. The two ducts 13 and 14 are connected through a number of parallel heater pipes 15.

As is shown in Fig. 1, the cylinder 2 communicates through a duct 16, heater pipes 17 and a duct 18 with the space 6. The cylinder 3 communicates through a duct 19, heater pipes 20 and a duct 21 with the space 7. The cylinder 4 communicates through a duct 22, heater pipes 23 and a duct 24 with the space 8. The space 5 communicates through a duct 25 with the space below the piston in the cylinder 2 (Fig. 2). Similarly the spaces 6, 7 and 8 communicate with the associated spaces below the pistons in the cylinders 3, 4 and 1, respectively. The hot spaces are above the pistons which reciprocate with a constant phase difference and the cold spaces are below the pistons. The heater pipes 15, 17, 20 and 23 are arranged in such manner that each group of heater pipes associated with one cycle is located in part between a group of heater pipes associated with a further cycle and a common burner 26. The heater pipes form together a wall to which heat energy is supplied by means of the combustion gases. In the construction shown, each group of heater pipes communicates with a space for a regenerator and a cooler and with the working space above the piston in the cylinder located next but one from said space, the groups of pipes all being connected in the same sense.

The combustion gases supplied with the use of the common burner 26 pass through the groups of heater pipes and give off heat energy to these pipes. The combustion gases leave the engine at 27. Owing to the arrangement of the heater pipes each group of heater pipes absorbs substantially an equal quantity of energy.

In Figs. 3 and 4 which also show a double-acting four-cycle engine, the same reference numerals designate parts corresponding to those shown in Figs. 1 and 2. The space 12 over the piston 11 in the cylinder 1 communicates through a number of parallel pipes 31 with the space 5 containing the regenerator 9 and the cooler 10, which communicate through the duct 25 with the working space below the piston in the cylinder 4. In this engine also, the spaces above the pistons are the hot spaces and the spaces below the pistons are the cold spaces; the pistons also reciprocate with a constant phase difference. The parallel pipes 31 form the heater for the working medium, which performs a thermodynamic cycle in the intercommunicating spaces referred to above.

In a similar manner, the cylinder 2 communicates through the group of pipes 32 with the space 6; the cylinder 3 communicates through the group of pipes 33 with the space 7 and the cylinder 4 communicates through the group of pipes 34 with the space 8. The spaces 6, 7 and 8 communicate each through a duct (not shown) with the cold spaces below the pistons in the corresponding cylinders 1, 2 and 3. The groups of pipes 31, 32, 33 and 34 each comprise three parallel pipes and each pipe opens at one end into a hot space and at the other end into a regenerator space. The pipes of the groups form a common wall, to which the heat energy is supplied by combustion gases supplied from a ring burner 35. The combustion gases leave the engine at 36. The heater pipes of each group are substantially helical as is shown. Similarly, as in the engine shown in Figs. 1 and 2, the pistons act upon a common transmission mechanism (not shown), for example a swash plate.

In the engine shown in Figs. 5 and 6, each space comprising a regenerator and cooler is arranged about the associated cold space and the coolers communicate directly with the associated cold space.

It has been found that with this construction an increase in output and specific power is obtained as compared with engines in which a communicating duct of comparatively great size is provided between the cooler and the associated cold space. This embodiment furthermore provides the advantage that in the supply of working medium to the regenerator and the cooler the losses due to resistance to flow may be smaller and the complication of providing guide blades may be avoided. In Figs. 5 and 6 parts corresponding to those shown in Figs. 1 and 2 are designated by the same reference numerals. The engine is a four-cylinder double-acting thermodynamic reciprocating engine comprising the four cylinders 1, 2, 3 and 4. In each cylinder a piston is adapted to reciprocate. The working space within the cylinders above each piston is the hot space which communicates through a heater, a regenerator and a cooler with a cold space located below another of the pistons. The space 12 above the piston 1 communicates through a group of pipes 41 and a regenerator and a cooler (not shown) with the cold space below the piston in the cylinder 4. In a similar manner the hot space of the cylinder 4 communicates through a group of pipes 45, a regenerator 42 and a cooler 43 with the cold space 44 below the piston in the cylinder 3. Similarly, the hot space above the piston in the cylinder 3 communicates through a heater 46 with the cold space below the piston in the cylinder 2, and the hot space above the piston in the cylinder 2 communicates through a heater 47, a regenerator 48 and a cooler 49 with a cold space 50 below the piston in the cylinder 1. The heater pipes are preferably arranged in a manner such that the connection with the associated regenerator is at right angles or substantially at right angles to the regenerator end surface. It has been found by experiments that in this construction compared with the known double-acting engine an increase in specific power of 10% or more may be obtained.

The pipes of the heaters 41, 45, 46 and 47 together form a wall, to which heat energy is supplied by means of the combustion gases of a burner not shown.

As will be evident from Fig. 5 pipe 52 of the heater 46 is the bottom pipe of the group. The pipes 53, 54, 55 and 56 are above the pipe 52. The pipes 57, 58, 59, 60, 61, 62 and 63 are in turn provided above pipes 52 to 56. The connections of the pipes are evenly distributed in the end plane of the associated regenerator. In this manner, a symmetrical pipe pattern is obtained. Moreover, all the pipes of each group have preferably substantially equal lengths and provide substantially equal resistance to flow.

The thermodynamic reciprocating engines described above are all four-cylinder, double-acting engines. It will be obvious that the engine according to the invention may comprise two, three or more cylinders, and may be either single-acting or double-acting engines.

What we claim is:

1. A thermodynamic reciprocating engine of the double-acting type having a working medium and at least two closed cycles, each cycle comprising: a cylinder, a reciprocating member in said cylinder, a container adjacent to said cylinder, a cooler in said container, a regenerator housed in said container, and a heat exchanger including at least one connecting element opening at one end into said cylinder and at the other end into said container, said element being arranged outside said cylinder and forming a wall for the exchange of heat energy, the portion of wall surface associated with one cycle being substantially equal to the portion of wall surface associated with at least one other cycle.

2. A thermodynamic reciprocating engine of the double-acting type having a working medium and at least three closed cycles, each cycle comprising: a cylinder, a reciprocating member in said cylinder, a container adjacent to said cylinder, a cooler and a regenerator in said container, said cylinders being arranged in the form of an annulus, and a heat exchanger including at least one connecting element opening at one end into said cylinder and at the other end into said container, said connecting element having part thereof at right angles to the center line of said cylinder, said element being positioned outside said cylinder and forming a wall for the exchange of heat energy, the portion of wall surface associated with one cycle being substantially equal to the portion of wall surface associated with at least one other cycle.

3. A thermodynamic reciprocating engine as set forth in claim 1 wherein said cylinders, and said containers are arranged in the form of an annulus.

4. A thermodynamic reciprocating engine as set forth in claim 1 further including a hot space above said reciprocating member and a cold space below thereof, and said regenerator and cooler in said container being arranged adjacent to their associated cold space, and duct means communicating each cooler directly with said associated cold space.

5. A thermodynamic reciprocating engine of the double-acting type having a working medium and at least two closed cycles, each cycle comprising: a cylinder being provided with a hot space, a reciprocating member in said cylinder, a receptacle adjacent to said cylinder, a cooler in said receptacle, a regenerator in said receptacle, burner means, and a heat exchanger comprising a plurality of groups of connecting elements, each group of connecting elements being provided with a plurality of substantially parallel heater pipes associated with one cycle and being arranged between said burner means and another group of elements associated with another cycle, each of said connecting elements opening at one end into said cylinder and at the other end into said receptacle, said elements being arranged outside said cylinders and each having a part thereof at right angles to the center line of said cylinders, said elements forming a wall for the exchange of heat energy, the portion of wall surface associated with one cycle being substantially equal to the portion of wall surface associated with at least one other cycle.

6. A thermodynamic reciprocating engine as set forth in claim 5 wherein said elements are partly helical in shape.

7. A thermodynamic reciprocating engine as set forth in claim 5 wherein said connecting elements of each group are of substantially equal length whereby said connecting elements offer substantially equal resistance to the flow of said working medium.

8. A thermodynamic reciprocating engine as set forth in claim 5 and further including a first common duct opening into said cylinder and a second common duct opening into said receptacle, and each of said connecting elements communicating with said first common duct at one end and communicating with said second common duct at the other end thereof.

References Cited in the file of this patent

UNITED STATES PATENTS

| | | |
|---|---|---|
| 289,482 | Wilcox | Dec. 4, 1883 |
| 324,061 | Woodbury et al. | Aug. 11, 1885 |
| 334,153 | Babcock | Jan. 12, 1886 |
| 368,642 | Baird | Aug. 23, 1887 |
| 445,904 | Robinson | Feb. 3, 1891 |
| 1,678,396 | Koenig | July 24, 1928 |
| 1,800,306 | Löffler | Apr. 14, 1931 |
| 1,879,563 | Smith | Sept. 27, 1932 |
| 2,050,465 | Salvo et al. | Aug. 11, 1936 |
| 2,067,453 | Lee | Jan. 12, 1937 |
| 2,160,898 | Peff | June 6, 1939 |
| 2,272,925 | Smith | Feb. 10, 1942 |
| 2,557,607 | Lubbock et al. | June 19, 1951 |
| 2,564,097 | Rinia et al. | Aug. 14, 1951 |
| 2,596,057 | Van Heeckeren et al. | May 6, 1952 |